Patented Apr. 15, 1947

2,419,186

UNITED STATES PATENT OFFICE 2,419,186

MANUFACTURE OF VINYL CYANIDE

Charles R. Harris, Lockport, and William C. Sharples, Niagara Falls, N. Y., assignors to E. I. du Pont de Nemours & Company, Wilmington, Del., a corporation of Delaware No Drawing. Application November 11, 1944, Serial No. 563,098

12 Claims. (Cl. 260—464)

This invention relates to the manufacture of vinyl cyanide by the reaction of hydrocyanic acid with acetylene and more particularly to carrying out that reaction in the vapor phase in the presence of a supported catalyst.

This application is a continuation-in-part of our copending application Serial No. 499,822, filed August 24, 1943.

The production of vinyl cyanide by the vapor phase catalytic reaction between acetylene and hydrocyanic acid is described in the German Patent 559,734, issued September 23, 1932. The process of the German patent consists in passing a mixture of acetylene and hydrocyanic acid over a catalyst comprising a metal compound such as a metal cyanide, or a material having a high surface activity such as highly activated carbon, silica gel or the like, or a mixed catalyst wherein the material of high surface activity is utilized as a support for the metal compound. We have found that of the various catalysts suggested by this German patent, the best results are usually obtained by using as catalyst activated carbon impregnated with an alkali metal cyanide. However, the process described in the German patent has not been found satisfactory for commercial operation. The yield of product is low and the catalyst rapidly deteriorates and soon becomes inactive. Also, temperature control of the exothermic reaction is very difficult.

An object of the present invention is to provide an improved catalytic process for reacting hydrocyanic acid with acetylene to produce vinyl cyanide. A further object is to provide an improved catalyst for this reaction. Another object is to provide a novel and efficient support for the catalyst. Other objects will be apparent from the ensuing description of our invention.

We have discovered that the yield of vinyl cyanide and the life of the catalyst can be increased to a marked extent in carrying out the above-mentioned catalytic reaction by using as catalyst an alkali metal cyanide, alkali metal carbonate or alkaline earth metal cyanide which is supported on certin solid materials having low surface activity. For example, we obtain excellent yields of vinyl cyanide by using as catalyst unactivated wood charcoal which has been impregnated with sodium cyanide, a mixture of sodium and potassium carbonates, or a mixture of sodium and potassium cyanides. Further, we have found that whereas the catalyst having activated carbon as its support rapidly deteriorates and soon becomes inactive, the catalyst made with unactivated carbon has a relatively long life, and often can be used indefinitely. When deteriorated, the catalyst can readily be regenerated by simply heating in the presence of an inert gas, or by heating in vacuo. With our improved catalyst, no difficulty is experienced in controlling and regulating the reaction temperature within narrow limits.

In practicing our invention, good results are obtained with alkali metal cyanide as the catalytic agent and a reaction temperature, as measured at the hottest part of the catalyst mass, not lower than the approximate melting point of the alkali metal cyanide used in the catalyst. Preferably we maintain the reaction temperature at 50 to 100° C. above the aforesaid melting point, but not higher than approximately 700° C. While we generally prefer to carry on the reaction at temperatures above 500° C., the reaction will also take place at temperatures as low as around 350° C., but at such low temperatures the reaction rate is relatively slow.

In one method of practicing our invention, a mixture of hydrocyanic acid and acetylene is preheated to a temperature of 450 to 500° C. and passed over a catalyst made by impregnating wood charcoal with about 20% by weight of sodium cyanide, at a reaction temperature of 570 to 600° C., measured at the hottest part of the catalyst. The reaction temperature may be controlled by the rate of passage of the reactants, and also, if necessary, by the addition of a diluent gas such as an excess of either reactant, carbon monoxide, nitrogen, hydrogen, or a hydrocarbon gas such as methane, ethane, or the like. The gases passing from the catalyst are passed through a condenser wherein the vinyl cyanide is recovered as the condensate liquid. The crude condensate, which may contain hydrocyanic acid, acetylene, or both in solution may readily be purified by distillation. If desired, the uncondensed gases may be recycled through the reactor.

Example 1

A catalyst was prepared as follows:

Wood charcoal which had been devolatilized by heating to about 1000° C. in a closed retort was broken up into particles approximately ⅜ inch size and impregnated with about 20% by weight of sodium cyanide. The cyanide was applied by treating the charcoal with a solution of the cyanide in liquid ammonia and evaporating off the ammonia.

A mixture of one part hydrocyanic acid vapor, two parts of acetylene and 1.7 parts of hydrogen (all parts by volume), preheated to 430° C. was passed through the above described catalyst. As the reaction proceeded the temperature in the catalyst mass gradually increased and was maintained at 590 to 606° C.

The gases from the catalyst were first passed through a water-cooled condenser and then through a condenser cooled by a methanol-dry ice mixture. The condensate was distilled to obtain pure vinyl cyanide. The conversion of hydrocyanic acid to vinyl cyanide was 69% and the net yield based on hydrocyanic acid was 88.5%.

Example 2

The operation of Example 1 was repeated, except that the catalyst temperature was maintained at 599 to 612° C. The conversion of hydrocyanic acid to vinyl cyanide was 66.8% and the net yield based on hydrocyanic acid was 84.8%.

Example 3

The operation of Example 1 was repeated, except that the cyanide used in the catalyst consisted of equal parts by weight of sodium cyanide and potassium cyanide and the reaction temperature was 595 to 615° C. The conversion of hydrocyanic acid to vinyl cyanide was 75.5% and the net yield based on hydocyanic acid was 82.9%.

Example 4

The procedure described in Example 1 was followed, except that the catalyst consisted of graphite impregnated with sodium cyanide and the reaction temperature at the hottest point of the catalyst was 570-580° C. The conversion of hydrocyanic acid to vinyl cyanide was 35.5% and the net yield based on hydrocyanic acid was 71%.

Example 5

The procedure of Example 1 was utilized, except that the catalyst consisted of 3.2% by weight of equal parts by weight of sodium and potassium cyanides supported on 4-6 mesh "Tabular Alumina No. T61" (porous aluminum oxide of low surface activity manufactured by the Aluminum Company of America). The reaction temperature at the hottest point in the catalyst was 590-610° C. The conversion of hydrocyanic acid to vinyl cyanide was 66.4% and the net yield based on hydrocyanic acid was 85%.

Example 6

The operation of Example 1 was followed, except that the catalyst consisted of 10% by weight of equal parts by weight of sodium cyanide and potassium cyanide on 4-6 mesh pumice of low iron content. The reaction temperature was 590-610° C. The conversion of hydrocyanic acid to vinyl cyanide was 46.2% and the net yield based on hydrocyanic acid was 72.6%.

Example 7

The procedure of Example 1 was repeated, except that the catalyst consisted of Alundum pellets (porous pellets manufactured by the Norton Company from Alundum grain with silica as bonding agent) impregnated with 2% by weight of equal parts by weight of sodium carbonate and potassium carbonate. The reaction temperature was 590-610° C. The conversion of hydrocyanic acid to vinyl cyanide was 68.4% and the yield based on hydrocyanic acid was 81.2%.

Example 8

The procedure of Example 1 was repeated, except that the catalyst consisted of 4.3% by weight of equal parts by weight of sodium carbonate and potassium carbonate on porous "Alfrax" pellets (manufactured by The Carborundum Company from aluminum oxide grain with silica as bonding agent). The reaction temperature was 580-600° C. The conversion of hydrocyanic acid to vinyl cyanide was 84.1% and the yield based on hydrocyanic acid was 88%.

Example 9

The procedure of Example 1 was repeated, except that the catalyst consisted of 9% by weight of a mixture of equal parts by weight of sodium cyanide and potassium cyanide supported on insulating brick (Babcock and Wilcox K30, made from kaolin) crushed and screened to 4-6 mesh size. The conversion of hydrocyanic acid to vinyl cyanide was 47% and the net yield based on hydrocyanic acid was 81.2%.

Example 10

A supported catalyst was prepared by dissolving zinc cyanide, sodium cyanide, and potassium cyanide in liquid ammonia under pressure in the ratio of 20% zinc cyanide, 40% sodium cyanide and 40% potassium cyanide and adding 80 grams of 4-6 mesh glowed wood charcoal per 20 grams of the cyanide mixture. The ammonia was evaporated while the mixture was slowly agitated to secure a uniform catalyst.

The procedure of Example 1 was repeated using this catalyst at a temperature of 600° C. at the hottest point in the catalyst. The conversion of hydrocyanic acid to vinyl cyanide was 69.5% and the net yield was 89.0%.

Example 11

A supported catalyst was prepared by dissolving potassium cyanide and copper cyanide in the proportions of 27% potassium cyanide to 73% copper cyanide in a mixture of ammonium hydroxide and hydrocyanic acid adding 4-6 mesh glowed wood charcoal and evaporating the mixture to dryness under a vacuum. During the evaporation, the mixture was agitated to secure uniform coating of the charcoal particles. This catalyst was placed in a chromium plating steel tube and heated to approximately 375° C. in a stream of nitrogen. At this temperature, a mixture of 700 cc. of acetylene, 600 cc. of hydrogen, and 350 cc. of HCN was then passed through the tube during 6 hours. The temperature was regulated to keep the "hot spot" at 400° C. The product was analyzed to determine the yields. The conversion of hydrocyanic acid to vinyl cyanide was 43.7% and net yield 90%.

Example 12

Example 11 was repeated, except that the temperature was maintained at 500° C. A 61.3% conversion and an 86% net yield of vinyl cyanide was obtained.

Example 13

A supported catalyst was prepared by impregnating glowed wood charcoal 0.5 x 0.25 inch in size with approximately 15% by weight of a mixture of equal parts of sodium cyanide and potassium cyanide.

A layer of the catalyst 7 ft. in depth and containing 111.2 cu. ft. was placed in an insulated vertical cylindrical reactor connected to a preheater and a heat exchanger for cooling the gaseous product. An acid neutralizer was also provided for scrubbing alkaline material from the crude product. The reaction system was provided with a cooling tower for the condensation of vinyl cyanide and hydrocyanic acid by scrubbing countercurrently with condensed product at −5 to −15° C., a continuous stripping column for stripping hydrocyanic acid and acetylene from the vinyl cyanide, and equipment necessary for recycling of the reaction gases and introduction of raw materials into the recycling gases.

The catalyst was brought up to a temperature of 475° C. by circulating natural gas through the preheater and reactor. Acetylene and hydrocyanic acid were then introduced into the recycling gas. As the concentration of the reactants increased, the temperature increased in the catalyst to 600° C. at which point the temperature was maintained by regulation of the rate of addition of acetylene and hydrocyanic acid which entered the reactor at 450 to 475° C. Operation was continued during about 540 hours with a consumption of 45,122 lbs. of acetylene and 46,169 lbs. of hydrocyanic acid. A yield of 66,754 lbs. of pure vinyl cyanide was obtained corresponding to a yield of 72.5% based on acetylene and 73.6% based on hydrocyanic acid.

In the catalyst for our invention we utilize as catalyst support any material which is substantially chemically inert toward the reactants, which has substantially no adverse catalytic effect on the reaction between acetylene and hydrocyanic acid and which has the required low surface activity. Materials having the low surface activity which is essential to the operation of our invention are those materials having a surface activity not greater than about 10 minutes, as determined by the standard chloropicrin accelerated tube test described in the Journal of Industrial and Engineering Chemistry, vol. 11, page 524 (June, 1919). We prefer to utilize materials having a surface activity of not over 5 minutes.

Thus we have found that materials having high surface activities are not suitable in the operation of our invention and tests have shown that samples of silica gel and activated carbon have surface activities much greater than 10 minutes. On the other hand, the charcoals used in Examples 1, 2, and 3 above when subjected to the standard chloropicrin test exhibited a surface activity not greater than about 3 minutes.

Illustrative of the materials which we have found suitable as catalyst supports in the operation of our invention are: various unactivated forms of carbon such as wood charcoal, graphite, coke, coal, and the like, alumina, pumice, Alundum, vitreous silica, and insulating brick. Also suitable are silicon carbide, beryl, and calcium sulfate. Magnesium sulfate, porcelain, clays of low iron content, and various other similar materials may also be used with satisfactory results. Various refractory crystalline minerals such as feldspar, barite, and fluorspar, which are low in catalytic impurities such as iron, nickel, manganese, cobalt, and copper, may be used. Furthermore, we may use certain metals which are inactive and which do not have any adverse effect on the reactants or product, for example, chromium, aluminum, silver, and gold. If desired, these metals may be plated onto steel or other base metal. It is essential, however, that no iron come into contact with the reactants at the reaction temperature. We have also discovered that good results are obtained when marble chips, magnesium oxide, and fibrous asbestos are utilized as catalyst supports.

As catalyst support wood charcoal which may be made from any common variety of wood and which has not been treated to substantially increase its surface activity may be used. Other forms of vegetable charcoal are likewise suitable. If desired, the charcoal may be treated to remove volatile materials therefrom for example, by heating at an elevated temperature for a time and at a temperature which would depend upon the amount of volatile materials which it is desired to remove. For example, if it is desired to substantially completely remove the volatile materials, the charcoal may be heated to 700 to 1100° C. for a period of not more than about two hours. The purpose of removing volatiles from the charcoal is primarily to avoid contamination of the product with the volatile compounds and is not essential for the practice of our invention. It should be noted that if the charcoal is thus treated to remove volatiles care must be taken to avoid undue activation of the charcoal during the heating step. Such activation generally can be avoided by keeping oxygen water vapor or other activating reagent from the material during heating and by avoiding prolonged heating.

Although the above-mentioned materials and various similar materials, which will be apparent to those skilled in the art, are satisfactory in the operation of our invention, it is essential that the particular material utilized have a surface activity not greater than about 10 minutes, as previously disclosed; that the catalyst support be substantially chemically inert toward the reactants and have substantially no adverse catalytic effect on the reaction. We prefer to use as the catalyst support a material which has no appreciable catalytic effect on the reaction as we have found that optimum results are thus obtained.

Of the materials meeting the requirements of our invention, we prefer to use alumina, silicon carbide, or carbon. We have found that best results are obtained with these materials and they are readily obtainable in a form suitable for use as catalyst support. We have previously described a method for preparing wood charcoal suitable for use as catalyst support. We have also found that grades of alumina designated "Tabular Alumina No. T60," "Tabular Alumina No. T61," "Tabular Alumina No. T70," and "Tabular Alumina No. T71," which are porous aluminum oxides of low surface activity manufactured by the Aluminum Company of America, are especially adapted to the requirements of the catalyst support of our invention, and we prefer to utilize one of these grades of alumina or its equivalent as we have found that high conversions and high yields of vinyl cyanide are consistently and economically obtained through the use of this material as the catalyst support. A satisfactory grade of silicon carbide is also commercially available. Calcium sulfate in satisfactory granular form has been obtained by crushing and screening plaster of Paris. Magnesium sulfate may be prepared for use in a similar manner.

The catalyst support may be prepared in the form of granules or the like to produce catalyst masses of conventional types. The catalyst support thus prepared may be coated or impregnated with the metal cyanide by well-known conventional methods. For example, we may treat the catalyst support with molten alkali metal cyanide, or with a solution of the cyanide followed by evaporation. Generally, we have obtained the best results by dissolving a metal cyanide in liquid anhydrous ammonia and impregnating the catalyst support with the ammonia solution, followed by evaporation of the solvent. If an aqueous solution is used to impregnate the catalyst support, evaporation should be carried out to substantially completely remove the water.

The proportion of cyanide in the catalyst mass may be varied over a wide range. Generally the effectiveness of the catalyst will depend more or less on its cyanide content, and we usually prefer to coat or impregnate the support with about the maximum amount of cyanide that will be retained on the support at temperatures above the melting point of the cyanide. This amount will vary, depending on the size and porosity and specific weight of the supporting material, for example, from less than 1% up to 50% by weight. We generally prefer to use a porous support such as alumina containing 1 to 10% by weight of the cyanide.

As the catalytic agent to be supported on the material of low surface activity we may use an alkali metal cyanide or a mixture of alkali metal cyanides although the alkaline earth metal cyanides are also more or less effective for this purpose. In place of the cyanide, the support may be impregnated or coated with materials capable of reacting with hydrocyanic acid to form cyanide, for example, alkali metal hydroxides, oxides, carbonates, borates, and the like. We have found that alkali metal carbonates are particularly suitable. When the catalyst is placed in use, the hydrocyanic acid will react with such basic compounds to form cyanide at the surface of the catalyst mass. In place of the alkali metal cyanides we may also use double cyanides of alkali or alkaline earth metals with heavy metals, for example, sodium zinc cyanide, potassium copper cyanide, potassium cadmium cyanide, and the like. We have obtained good results by impregnating the catalyst support with a mixture of zinc cyanide and sodium cyanide or a mixture of copper cyanide, sodium cyanide, and potassium cyanide.

While the cyanides of the alkali metals in general are suitable for our invention, we prefer to use the cyanides of sodium and potassium, which are cheaper and more readily available and also usually are more effective than the other alkali metal cyanides. A preferred catalyst consists of a mixture of equal parts by weight of sodium and potassium cyanides supported on unactivated wood charcoal. In one method of preparing this catalyst, we impregnate granules of wood charcoal with a solution of the sodium and potassium cyanides in anhydrous liquid ammonia and evaporate the solvent. This catalyst produces high yields of vinyl cyanide and has a satisfactory catalyst life. Also, as this mixture of sodium and potassium cyanides has a melting point of approximately 510° C., which is lower than that of either of its components, this catalyst may be operated at lower temperatures, for example, at temperatures of 520–600° C., while keeping the reaction temperature above the melting point of the mixture. Another preferred catalyst consists of a mixture of sodium and potassium carbonates which may be applied to the catalyst support in the same manner as that described above for the use of cyanide catalysts.

If desired, the cyanide component of the supported catalyst may be diluted by admixture of other substances which have no adverse chemical or catalytic action on the reactants and product. For example, alkaline materials such as those described above which react with hydrocyanic acid to form cyanides may be added. Also, we may add fusible salts such as alkali metal halides, borates, or carbonates to modify the melting point of the cyanide component of the catalyst. However, we prefer to use undiluted alkali metal cyanides.

We claim:
1. The process for the production of vinyl cyanide which comprises reacting acetylene with hydrogen cyanide in the vapor phase in the presence of at least one alkali metal cyanide supported on alumina, said alumina being chemically inert toward the components of the reaction mixture, having substantially no adverse catalytic effect on the reaction and having a surface activity of less than about 10 minutes (standard chloropicrin test).

2. The process for the production of vinyl cyanide which comprises reacting acetylene with hydrogen cyanide in the vapor phase in the presence of at least one alkali metal cyanide supported on alumina, said alumina being chemically inert toward the components of the reaction mixture, having substantially no adverse catalytic effect on the reaction and having a surface activity which is not greater than 5 minutes (standard chloropicrin test) at a temperature not lower than about the melting point of said cyanide and not higher than about 700° C.

3. The process for the production of vinyl cyanide which comprises reacting acetylene with hydrogen cyanide in the vapor phase in the presence of at least one alkali metal cyanide supported on silicon carbide, said silicon carbide being chemically inert toward the components of the reaction mixture, having substantially no adverse catalytic effect on the reaction, and having a surface activity of less than about 10 minutes (standard chloropicrin test).

4. The process for the production of vinyl cyanide which comprises reacting acetylene with hydrogen cyanide in the vapor phase in the presence of at least one alkali metal cyanide supported on silicon carbide, said silicon carbide being chemically inert toward the components of the reaction mixture, having substantially no adverse catalytic effect on the reaction and having a surface activity which is not greater than 5 minutes (standard chloropicrin test) at a temperature not lower than about the melting point of said cyanide and not higher than about 700° C.

5. The process for the production of vinyl cyanide which comprises reacting acetylene with hydrogen cyanide in the vapor phase in the presence of at least one alkali metal cyanide supported on carbon, said carbon being chemically inert toward the components of the reaction mixture, having substantially no adverse catalytic effect on the reaction and having a surface activity of less than about 10 minutes (standard chloropicrin test).

6. The process for the production of vinyl cyanide which comprises reacting acetylene with hydrogen cyanide in the vapor phase in the presence of at least one alkali metal cyanide supported on carbon, said carbon being chemically inert toward the components of the reaction mixture, having substantially no adverse catalytic effect on the reaction and having a surface activity which is not greater than 5 minutes (standard chloropicrin test) at a temperature not lower than about the melting point of said cyanide and not higher than about 700° C.

7. The process for the production of vinyl cyanide which comprises reacting acetylene with hydrogen cyanide in the vapor phase in the presence of sodium cyanide supported on alumina, said alumina being chemically inert toward the components of the reaction mixture, having substantially no adverse catalytic effect on the reaction and having a surface activity of less than about 10 minutes (standard chloropicrin test).

8. The process for the production of vinyl cyanide which comprises reacting acetylene with hydrogen cyanide in the vapor phase in the presence of a catalyst comprising a mixture of approximately equal parts by weight of sodium and potassium cyanides supported an alumina, said alumina being chemically inert toward the components of the reaction mixture, having substantially no adverse catalytic effect on the reaction and having a surface activity of less than about 10 minutes (standard chloropicrin test).

9. The process for the production of vinyl cyanide which comprises reacting acetylene with hydrogen cyanide in the vapor phase in the presence of a catalyst comprising an alkali metal cyanide supported on an inert carrier having a surface activity of less than about 10 minutes (standard chloropicrin test).

10. The process for the production of vinyl cyanide which comprises reacting acetylene with hydrogen cyanide in the vapor phase in the presence of a catalyst comprising an alkali metal cyanide supported on an inert carrier having a surface activity of less than about 10 minutes (standard chloropicrin test) at a temperature not lower than the melting point of said alkali metal cyanide and not higher than about 700° C.

11. The process for the production of vinyl cyanide which comprises reacting acetylene with hydrogen cyanide in the vapor phase in the presence of a catalyst comprising an alkali metal cyanide supported on an inert carbonaceous material having a surface activity of less than about 10 minutes (standard chloropicrin test).

12. The process for the production of vinyl cyanide which comprises reacting acetylene with hydrogen cyanide in the vapor phase in the presence of a catalyst comprising an alkali metal carbonate supported on an inert carrier having a surface activity of less than about 10 minutes (standard chloropicrin test) at a temperature of 500° to 700° C.

CHARLES R. HARRIS.
WILLIAM C. SHARPLES.

REFERENCES CITED

The following references are of record in the file of this patent:

UNITED STATES PATENTS

| Number | Name | Date |
| --- | --- | --- |
| 2,224,022 | Kurtz | Dec. 3, 1940 |
| 2,265,509 | Boesler et al. | Dec. 9, 1941 |
| 2,265,286 | Japs | Dec. 9, 1941 |

FOREIGN PATENTS

| Number | Country | Date |
| --- | --- | --- |
| 559,734 | German | Sept. 23, 1932 |

OTHER REFERENCES

Berkman et al., "Catalysis," Reinhold Publ. Co., 1940, p. 456.